May 28, 1963
B. H. ARMBRECHT ET AL
3,091,697
PHOTOMULTIPLIER CONTROL CIRCUIT
Original Filed March 3, 1955
2 Sheets-Sheet 1
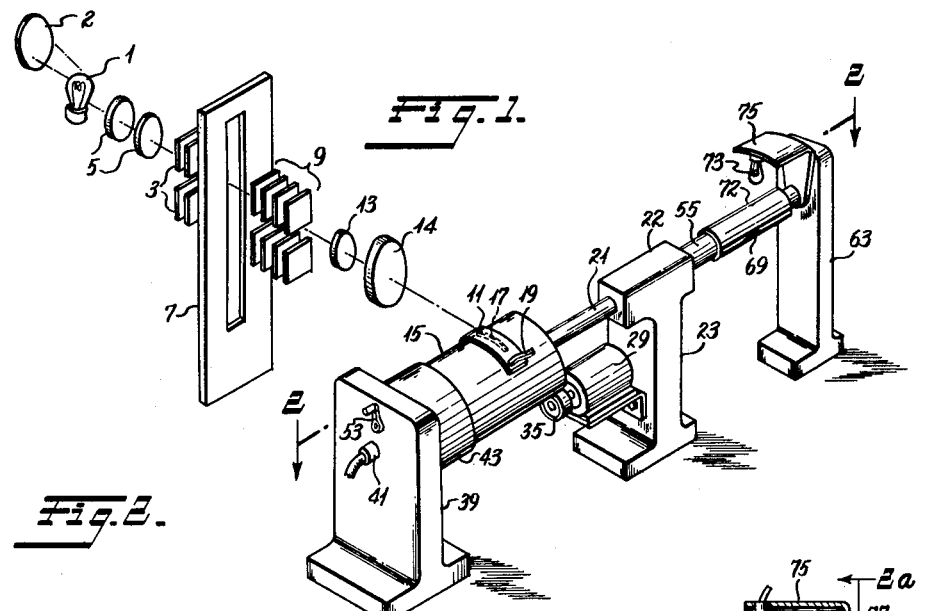
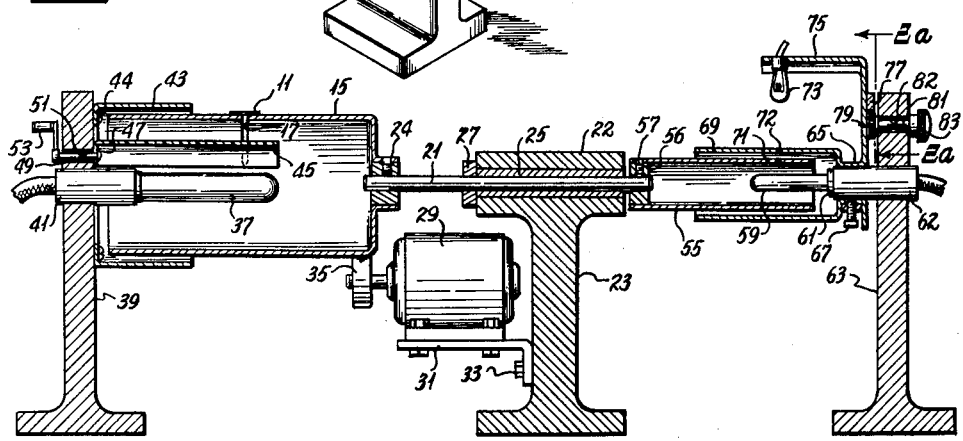
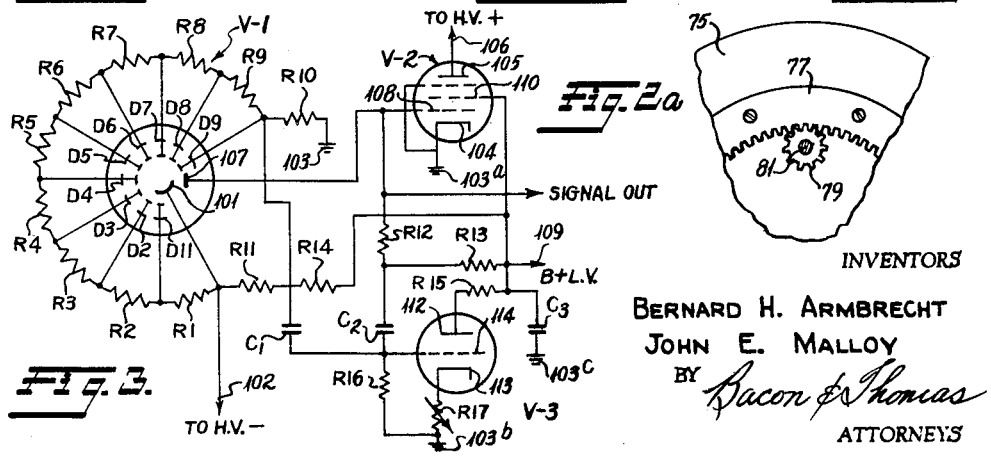
INVENTORS
BERNARD H. ARMBRECHT
JOHN E. MALLOY
BY Bacon & Thomas
ATTORNEYS May 28, 1963  B. H. ARMBRECHT ET AL  3,091,697
PHOTOMULTIPLIER CONTROL CIRCUIT
Original Filed March 3, 1955  2 Sheets-Sheet 2
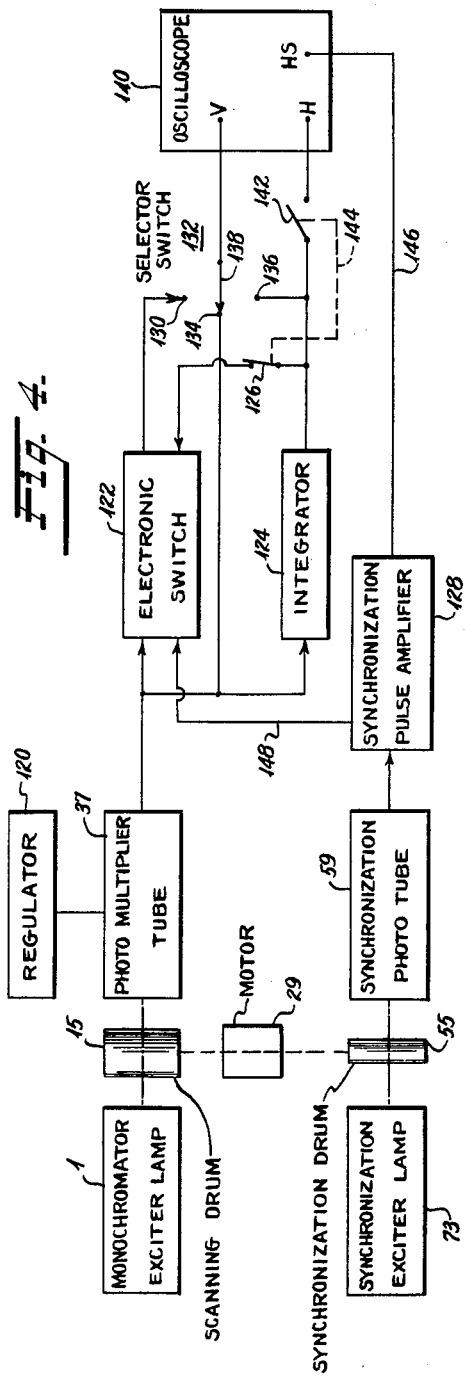
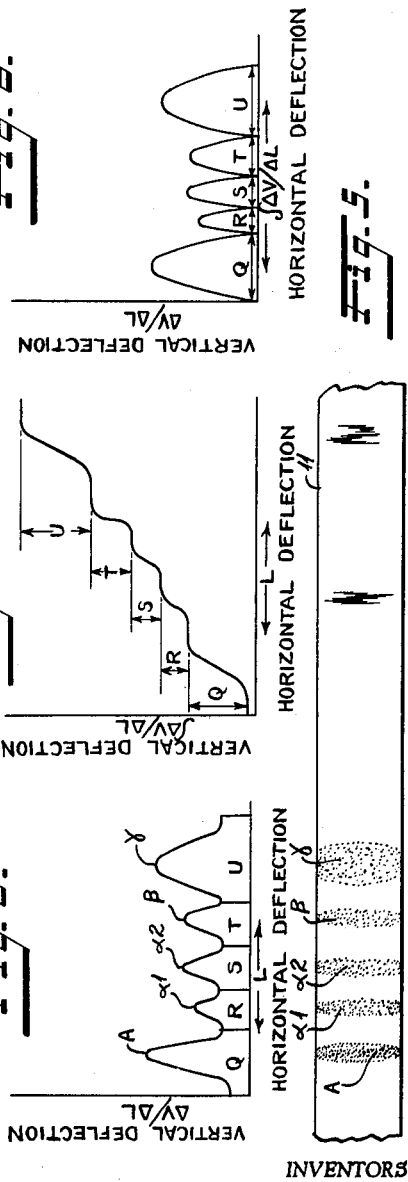
INVENTORS
BERNARD H. ARMBRECHT
JOHN E. MALLOY
BY
Bacon & Thomas
ATTORNEYS United States Patent Office 3,091,697
Patented May 28, 1963

3,091,697
PHOTOMULTIPLIER CONTROL CIRCUIT
Bernard H. Armbrecht, Hyattsville, and John E. Malloy, Cheverly, Md.; said John E. Malloy assignor to Ethel D. Armbrecht, Hyattsville, Md.
Original application Mar. 3, 1955, Ser. No. 491,882, now Patent No. 2,972,925, dated Feb. 28, 1961. Divided and this application Feb. 15, 1961, Ser. No. 99,016
5 Claims. (Cl. 250—207)

This invention relates to photometric testing, and more particularly to a method of and apparatus for obtaining photometric density or absorbance measurements along a test strip having zones of varying optical characteristics and automatically displaying the resultant data for visual observation.

While certain of the novel features of this invention may be advantageously utilized in densitometers and associated electronic measuring circuits for a wide variety of purposes, the invention is especially adapted to the measurement of the optical characteristics of the various zones of test strips obtained by electrophoresis or chromatographic methods whereby a rapid, accurate, and readily reproducible indication of the results of testing by such strips may be obtained. The exact evaluation of the relative amounts of darkening or coloration of a test strip along its length is one of the most important and the most difficult phases of such a tesing procedure.

A photographic test strip may be prepared by use of a sensitometer, as when measurements are made of the photographic qualities of camera film, or by exposure to light passed through a chemical solution in order to measure the concentration of solute in the solution. Translucent paper test strips have recently been prepared in electrophoretic measurements of the relative concentration of different proteins and colloids in suspension in a common solvent. The test strip in this instance is covered with the chemical sample and an electrical potential is placed across the length of the strip for a period of time. Due to the different electrophoretic mobilities of the component protein colloids, a concentration of the different components is obtained at different areas along the strip. A dye which stains the protein material is then placed on the strip to produce a series of more or less opaque areas each having a dye content proportional to the amount of the particular protein, and having optical absorption characteristics of the same order.

Heretofore, various methods have been used for measuring the relative amounts of the proteins, amino acids, and other chemical compounds separated on paper, fiber, or film strips by electrophoresis or chromatography. In one of these methods, the separated component zones on the sample strip, rendered visible by staining, are cut out. The dye in each section is then eluted and estimated colorimetrically. This method is laborious, time-consuming, and the sample strip is destroyed. Another method employs a cylindrical lens optical system which converts the separated and dyed fraction bands on the sample strip into a shadowgraph on photographic print paper. Better results are obtained if a contact film print of the sample strip is first prepared and the film print is used in the optical system. The resulting shadowgraph envelope outline is the rate of absorbance change for the fraction bands as a function of the distance along the length of the strip. The configuration of each component curve is dependent on the amount of dyed material in the band passing through a maximum across the width of the band. The areas under the corresponding curves derived from the fraction bands are measured planimetrically. This method is also time-consuming. Another method employs intermittent densitometry along the length of the sample strip, according to the relationship $$A = \log_{10}(1/T) \tag{I}$$

where $A$ is the absorbance, formerly called optical density, and transmittance $T$ is the ratio of radiant power $P$ transmitted by the band on the sample strip to the radiant power $P_0$ transmitted by a clear portion of the strip. The nomenclature used herein is that recommended by Report No. 6 of the Joint Committee on Nomenclature in Applied Spectroscopy, H. K. Hughes, Chairman, published in Analytical Chemistry 24, 1349 (1952). The data at each increment must be read from a meter, plotted point by point on graph paper, and measured planimetrically, or the area must be computed by some other suitable method. If said data were ideal, it would follow the absorption law $$P = P_0 10^{-abc} \tag{II}$$

where absorbance is $-abc$, absorptivity $a$ is a constant characteristic of the material at a specified frequency of radiant energy, $b$ is the radiant energy path length, and $c$ is the concentration of material present. The bands in paper strips at higher absorbancy values have been observed to deviate from ideal behavior. Therefore errors can enter during data transcription to the graph paper, while area measurements are made or the deviation remains uncompensated.

Still another method uses continuous photometry where a recording meter automatically plots the densitometer data against length along the sample strip. In these instruments, the exponential light absorbance function is converted to a linear signal function, such as described by M. H. Sweet [Journal of the Society of Motion Picture and Television Engineers, 54, 35 (1950), and earlier in Electronics, 19, No. 11, 105–109 (1946)]. The relationship for multiplier phototubes at constant current is $$V = d - b \log P \tag{III}$$

where $d$ and $b$ are circuit constants. In some instruments, the sample strip is rerun, and an integrated curve of the previously plotted differential curve is plotted in superposed position. The differential curve aids in delineating the separation points for band zone areas on the integrated curve. Some instruments of this type use a dual pen recording meter which simultaneously plots both curves, effecting a saving of time and operator effort. However, the mass of the meter-sensing device limits the maximum speed at which reliable resolution is secured. The friction between the pen and the meter chart papers is another factor which reduces accuracy and sensitivity, and while this may be eliminated by using a light beam and sensitized paper, the former objection still remains. Unfortunately, the less dense zones on the translucent strips, which scatter light, are proportionately reduced concomitantly with adjusting the densitometers heretofore known to the most dense zone value, and approach the random optical absorbance variations of the supporting sample strip itself.

In accordance with the present invention, the measurement of the absorbance of the test strips is accomplished through the use of an oscilloscope electronically coupled in a novel manner to means for repetitively scanning the test strip. An oscilloscope does not suffer from the mass and friction defects inherent to pen recording meters, and therefore can be operated at a very high speed. By using a repetitive scanning system rate faster than the cathode ray tube screen phosphor decay, a stable graphical trace is secured. The system of the invention also provides a novel method for graphing whereby the rate of change function of the absorbance of the strip at a given point may be plotted against its integrated function, thereby providing a curve which can be measured more accurately, simplifying the amount of equipment necessary and eliminating the need for a double curve presentation. Moreover, the novel means of the present invention, by introducing an appropriate and opposite nonlinearity in the phototube circuit, provides a vectorial compensation of each of the non-ideal behaviors of the translucent sample strips, particularly in the higher absorbance ranges, thereby materially increasing the useful absorbance range span.

Accordingly, an object of the present invention is to provide a method and a means for rapidly and automatically producing a visual display, of sharp definition and high resolution, of the relative absorbancy at each point along the length of a test strip whereby the results of a test by such strip are determined.

Another object of the invention is to provide a densitometer which will simultaneously plot a differential function of the absorbancy of a test strip against its integrated form for all points along the strip, and thereby provide a curve from which the test data may be quickly and accurately determined.

Another object of the invention is to provide an oscilloscope display of the relative amounts of sample and/or indicating material present in a test strip as a function of the position of such material along the test strip.

Another object of the invention is to provide an oscilloscope for plotting densitometer data in combination with means for rescanning the sample strip under such conditions as to provide a stable and flickerless presentation on the cathode ray tube screen.

Still another and an important object of the invention is to provide a densitometer which can accurately measure the varying absorbancy rate changes on a sample strip which has light-scattering complications and deviates from ideal behavior.

Still another object of the invention is to provide a densitometer which has a graphical display having selectively variable coordinate scales whereby variable absorbancy rate changes along the several zones of a test strip and differing distribution lengths of the individual zones may be shown in a uniform manner. This feature of the densitometer further provides means for studying an individual band in detail by providing appropriate scale magnification.

A further object of the invention is to provide a variable monochromatic narrow beam light source, having little penumbra, to illuminate the sample strip at wave lengths which are such that the maximum absorption of said light occurs.

Another object of the invention is to provide a method and means for automatically producing a visual display of the optical absorbancy characteristics along the length of a test strip in which different visual trace presentations of such characteristics are selectively obtainable.

Another object of the invention is to provide a method and means for simultaneously and automatically, visually displaying several different trace patterns indicative of the absorbancy characteristics of a test strip along its length.

Other and further objects and features of the invention will become apparent from a reading of the following specification taken in conjunction with the accompanying drawings in which:

FIG. 1 is a perspective view of a portion of the densitometer showing diagrammatically the arrangement of the optical system and scanning means;

FIG. 2 is a vertical sectional view through the scanning and synchronizing drums of the device of FIG. 1 on the line 2—2 showing the manner in which the phototubes and associated elements are mounted therein;

FIG. 2a is an enlarged fragmentary sectional view taken on the line 2a—2a of FIG. 2;

FIG. 3 is a circuit diagram showing in detail a novel photomultiplier tube and regulator circuit which may be employed in the system shown in FIG. 4 for controlling the linearity of the transmitted absorbance data;

FIG. 4 is a block diagram of the optical and electrical components of the combination of the invention, schematically showing the energy flow through the system;

FIG. 5 is a plan view illustrating a typical paper electrophoresis test strip having stained protein bands, the absorbancy of which may be measured by the instrument of the present invention;

FIG. 6 is illustrative of one form of oscilloscope display obtainable by the densitometer of the present invention, wherein the rate of absorbancy change of the strip of FIG. 5 is plotted against continuously successive points along its length;

FIG. 7 is illustrative of another oscilloscope display obtainable with the present device, wherein the rate of absorbancy change, as in FIG. 6, is integrated and plotted against continuously successive points along the strip;

FIG. 8 is an illustration of a third form of oscilloscope display obtainable with the present device, wherein the integrated function of the optical absorbance change rate of the strip of FIG. 5 is plotted against itself thereby algebraically eliminating the length function present in the trace presentations illustrated in FIGS. 6 and 7.

In order to rapidly and automatically obtain any of the aforementioned visual representations of the absorbancy relationships given above, the present invention utilizes a variable monochromatic light source; a photomultiplier tube; means for repetitively moving a test strip between the light source and photomultiplier tube; regulating means associated with the photomultiplier tube to partially compensate the paper absorption law (II) deviation; an electronic integrator for integrating with respect to time the signal voltages from the photomultiplier tube; an electronic switch to allow dual trace presentation of the signal voltages from the photomultiplier tube and integrator; a synchronization pulse and drive assembly; an oscilloscope for graphically presenting the densitometric data from the photomultiplier tube, electronic switch, and integrator; and a series of switching arrangements to afford a wide latitude and variation of circuit employment and trace presentation. For obtaining a single trace representation of the absorbance data with respect to the length of the test strip, both the electronic integrator and electronic switch are eliminated from the circuit, the latter being employed only when it is desired to present a dual trace simultaneously on the oscilloscope screen.

Referring now to FIGS. 1 and 2, light of constant intensity produced by lamp 1 and reflector 2 is concentrated on a multiple jaw adjustable horizontal slit system 3 by condensing lenses 5. The emergent beam, narrowly defined in a horizontal plane, then passes through an interference color wedge 7, which is a longitudinal scale movable lengthwise across the beam and effective to filter out all but a narrow wave band of the incident light. The particular color of the emergent monochromatic beam is controlled by the lengthwise position of wedge 7, the color being continuously variable over the whole visible spectrum from one to the other end of the wedge. The emergent beam from wedge 7 is then further concentrated into substantially parallel horizontal light rays by a second adjustable horizontal slit system 9, and is focused on test strip 11 by projecting lenses 13 and 14. Slit systems 3 and 9 each comprise a series of jaws separated by short distances in which the slit width becomes progressively narrower. The slits in system 9 are narrower than the slits in system 3. Consequently, the final image of slit system 9 focused on test strip 11 is not only extremely narrow, but is also substantially free of the penumbra and fogging which a single narrow slit would produce due to diffraction of the light beam passing through it. This results in a very sharply defined beam incident on strip 11, capable of producing a very high degree of resolution of the measurement described hereinafter.

Strip 11, which may be a test strip of the type shown in FIG. 5, is wrapped around substantially more than one-half of the periphery of the hollow cylindrical supporting drum 15 directly over a peripheral slot 17 cut through the drum and extending around the drum to the extent of 180°. Slot 17 is somewhat narrower in width than strip 11, and the strip therefore completely overlies the slot. At each end of slot 17, and spaced slightly therefrom, spring clips 19 are affixed to secure the ends of the strip 11 to the drum.

The drum 15 is carried by shaft 21, which is rotatably supported in journal 22 of standard 23. A locking nut 24 permits adjustment of the drum both axially and angularly with respect to the shaft 21. A bushing 25 of suitable anti-friction material reduces friction between the shaft and mounting means, and a collar 27 on the shaft prevents axial movement of the assembly to the right. The standard 23 carries a small variable-speed motor 29 by means of a bracket 31 attached thereto by bolts 33. The motor 29 is provided with a friction-type drive wheel 35 of rubber or the like, the periphery of which engages the periphery of drum 15 at a convenient point and therefore serves to drive the drum assembly. The size of the drive wheel 35 of the motor 29 may be selected to drive the drum 15 at a predetermined range speed. The drum 15, at its end opposite that affixed to shaft 21, is open and has a photomultiplier tube assembly 37 inserted therein and arranged so that its photo cathode is directly opposite the slot 17. The photomultiplier assembly 37 may also include a light shield (not shown) which has an adjustable opening over the cathode and in line with the optical axis of the densitometer assembly. The photomultiplier tube assembly 37 is carried by standard 39, which has socket 41 of the tube mounted therein. The standard 39 also carries a light shield 43 in the form of a concentric cylinder telescopically arranged over the open end of the drum 15, which may be secured to the standard 39 by means of screws 44. Adjustably mounted upon the standard 39, between the photomultiplier tube assembly 37 and the slot 17 of drum 15, is an optical step wedge 45 having a plurality of steps of different absorbancies transverse to the curved cross-section thereof. This means for mounting step wedge 45 include a flange 47 affixed to a rod 49, which extends through bore 51 in the standard 39. A crank arm 53 enables the step wedge 45 to be angularly shifted whereby the amount of light impinging upon the photomultiplier tube 37 through the strip 11 may be adjusted by interposing a step of suitable value. Accordingly, adjustment is provided to enable the instrument to take advantage of optimum conditions appropriate for the particular characteristics of the test strip employed.

The shaft 21, at its opposite end from drum 15, carries another drum 55 designated as a synchronizing pulse drum. This drum is also adjustably attached to the shaft 21 by means of a bushing 56 and lock screw 57, the face of bushing 56 acting to prevent axial movement of the assembly to the left with respect to journal 22. Motor 29, accordingly, drives the drums 15 and 55 at the same rotational speed. Drum 55 also has an open end in which is inserted a photo tube 59. This tube is carried by a socket 61, mounted in a collar 62 carried by a standard 63. Adjustably secured to the collar 62 by means of a concentric flange 65 and locking screw 67 is a light shield 69 in the form of an open-ended cylinder in concentric telescoping relationship with the drum 55. Extending through the peripheries of the drum 55 and the light shield 69 are small pinholes 71 and 72 lying in the same plane transverse to the axis of these members. These pinholes are placed so that at one position of the rotation of drum 55, the holes are in registry and in line with the filament of a lamp 73 and with the photo cathode of tube 59. Light from the lamp 73 enters the pinhole 72 in the light shield 69 and is thereby concentrated into a sharp beam. This beam cannot pass through pinhole 71 in drum 55 until the drum rotates to the precise position at which both pinholes are in alignment. Consequently, as the drum 55 rotates for a brief instant during each complete revolution, light passes through the pinholes and impinges on the photo tube 59. The latter then produces a sharp output voltage pulse. The drums 55 and 15 may be adjusted on shaft 21 so that their approximate angular relation to each other is such that the photo tube 59 delivers an output voltage pulse each time the scanning drum 15 brings the very beginning of the test strip 11 into the scanning light beam.

The lamp 73 is mounted on a bracket 75 which may be integral with the flange 65 carrying the light shield 69 so that this assembly is angularly adjustable with respect to collar 62. An arcuate gear rack 77 on bracket 75 in cooperation with a small pinion gear 79 on the end of shaft 81 extending through a bore 82 in standard 63 and terminating in knurled knob 83 permits the assembly to be readily rotated through a suitable arc. Thus, by turning knob 83 to adjust the angular position of the assembly, phasing adjustments may be made while the instrument is in operation so that variations in placement of strip 11 on drum 15 over slot 17 may be compensated.

The photomultiplier tube 37 may employ a modified Sweet circuit, such as described by Laurence, Journal of Scientific Instruments 31, 137 (1954), to provide a range of absorbancy units from 0 to 1, or by Clink, Electronics, 27, No. 3, 196 (1954), to provide a range of absorbancy units from 0 to about 1.5. In accordance with one feature of the present invention, the effective dynamic range of the Clink circuit may be expanded to about 3.05 units by modifying the dynode resistor network values and by providing a novel regulator circuit to automatically compensate for nonlinearity in the upper absorbancy range.

Referring now to FIG. 3 for a detailed description of the novel photomultiplier tube circuit and regulator circuit preferably employed by the system of the present invention, there is shown a photomultiplier tube V-1 having a plurality of dynodes, D1 through D9, each attached to a point in a voltage-dividing network comprising a plurality of resistances R1 through R9. Cathode 101 of the tube V-1 is connected to the negative terminal 102 of a suitable high-voltage source. The resistance network R1 to R9 is also connected to the negative terminal 102 of the high-voltage source and terminates at ground 103 through a further resistance R10. The resistance network, including R10, is connected through common ground 103 and 103a to the cathode 104 of pentode V-2, and thence to plate 105, which is connected to the positive terminal 106 of the high-voltage source. Plate 107 of the photomultiplier tube V-1 is connected to control grid 108 of the pentode V-2, and through resistances R12 and R13, to a suitable low-voltage source at 109. Control grid 110 of pentode V-2 is connected to low-voltage source 109, and through resistances R14 and R11, to the negative terminal of the high-voltage source 102. The circuit thus far corresponds essentially to the control circuit described by Clink, referred to above, and would provide substantially linear control throughout the lower values of optical absorbance. To accomplish the automatic regulatory feature of this invention, a triode V-3 is provided whose plate 112 is connected through R15 to the low-voltage source 109. The cathode 113 of tube V-3 is connected through variable resistance R17 to common ground 103b. Control grid 114 of triode V-3 is connected through condenser C1 to the terminal dynode D9 of photomultiplier tube V-1, to the junction of resistances R12 and R13 through condenser C2, and through resistance R16 to ground 103b. Condenser C3 connects the positive terminal 109 of the low-voltage source to common ground 103c.

In the operation of the circuit, the photomultiplier tube provides an output signal which contains alternating and direct current components both proportional to the incident light striking cathode 101. Both signals are coupled to the control grid 108 of pentode V-2. When light strikes the cathode 101, an electronic avalanche cascades down the dynode chain causing the plate 107 to go negative, and since the control grid 108 of V-2 is directly coupled, it, too, goes negative, causing tube V-2 plate resistance to increase. The resistances R11 through R14 function as a suppression network between the high-voltage negative supply 102 and the low-voltage positive supply 109. In the Clink circuit, the low-voltage supply is kept constant over the absorbance range. Here, however, the low-voltage automatically changes for different values of absorbancy. Therefore, the signal suppression on grid 108 of pentode V-2 also changes, according to the light flux at the photo tube cathode 101. A sample of this changing suppression signal is taken at the junction of R12 and R13 through condenser C2 and is fed to the grid 114 of V-3. Also the alternating current signal from dynode D9 is passed by condenser C1 to the grid 114 of V-3. Under strong illumination, of the photo cathode 101, the potential of grid 114 is practically discharged and the cathode 113 becomes more positive causing the triode V-3 to go to cut-off conditions. When the photo cathode 101 is weakly illuminated, a very weak signal comes from dynode D9. Thus condenser C1 no longer is removing electrons from the control grid 114 of tube V-3, and a charge builds up, restoring the tube V-3 to conduction which then draws current through resistance R15, partially discharging condenser C3. Since the regulator pentode V-2 grid 110 is also connected to this point, its differential varies according to the charge at condenser C3. This provides a second feed back loop, which supplies the added regulation needed to successfully allow pentode V-2 to control tube V-1 over absorbance values of from 0.05 to at least 3.05. For example, by using this arrangement, a 21-step photographic step tablet may be displayed on the oscilloscope in the measuring system described herein.

By varying the resistance R17, the shape of the step wedge trace can be changed from a linear display to a concave or convex curvature, thereby accomplishing substantially the result disclosed by Pierce, Patent No. 2,641,649, for controlling trace range (ratio of dark portion to light portion of a picture). This feature is of importance when the absorbance of a zone in a paper strip no longer behaves ideally, and the deviation needs to be vectorially compensated. The proper adjustment of the resistance R17 and in conjunction of step wedge 45 may be made by utilizing as a standard a suitable step wedge constructed from paper having dyed bands of different absorbancies. Such a paper step wedge preferably is of the same type as the paper used in the actual sample measurements, and the dye is preferably the same as that used for producing the optical absorbance gradient upon the sample strip on which measurement is to be made.

The values shown in Tables I and II below were collected by using the scanning device of FIGS. 1 and 2 with the circuit shown in FIG. 3, with a step wedge valued at from 0.05 to 3.05 absorbance units in 21 steps utilized as a test strip, and with resistances and condensers of the following fixed valuation: R1 to R6—100K; R7, R10—47K; R8—22K; R9—15K; R11, R13—10M; R12—12M; R14—3.3M; R16—1M; R17—100; C1—0.068 µf.; C2—0.047 µf.; C3—100 µf. The tube characteristics were as follows: V-1—931A; V-2—6AG5; V-3—6C4. The high voltage comprised 770 volts, and the low voltage comprised 135 volts measured to common ground.

TABLE I

V-1 Dynode Voltages and Current

| | Cathode | D1 | D3 | D5 | D6 | D9 | Total high voltage, ma. |
|---|---|---|---|---|---|---|---|
| Light (A, 0.05) | −700 | −400 | −240 | −185 | −140 | −28 | 0.37 |
| Dark (A, 3.05) | −700 | −600 | −410 | −300 | −220 | −50 | 0.97 |
| ΔE | | 200 | 170 | 125 | 80 | 22 | [1] 0.86 |

[1] Running average.

TABLE II

Regulation Circuit Voltages

| | V-2 | | V-3 | |
|---|---|---|---|---|
| | Dark | Light | Dark | Light |
| Plate | +38 | +520 | +60 | +120 |
| Grid 110 | +60 | +135 | | |
| Grid 108 | −0.6 | −3.6 | −0.6 | 0.0 |
| Cathode | | | +6 | +12 |

Under the foregoing conditions, the step-wedge display on the oscilloscope trace had substantially equal rise and transverse distances for all steps so that a straight edge could be superimposed over all 24 step corners.

From Table II and the current values from Table I, it may be computed that the plate resistance of tube V-2 varies from 1.4M ohms to 29K ohms for "dark" and "light" conditions respectively. This continuously and automatically adjustable resistance in series with the high-voltage source provides the regulation described above. Signal voltage on grid 108 of tube V-2 as correlated with absorbancy according to Equation III above is one volt per absorbance unit, and the output signal is preferably taken from this point. At other test points where voltage increments are indicated in the tables, a typical but less satisfactory test trace of the step tablet may be secured.

Since densitometric measurements are made along the length of strip 11 mounted on drum 15 and rotating at constant speed during the period of a scan the signal voltage from the photomultiplier tube 37 is a rate function of changing absorbancy, as defined by Equation III, of the material on strip 11 and the distance along the length of the strip, namely $\Delta V/\Delta L$.

The complete trace, as illustrated in FIG. 6 on the oscilloscope screen, is a plot of the continuously changing rate of absorbance along the length of strip 11 and the distribution distance of the several bands, namely $$\Delta V/\Delta L \text{ vs. } L \qquad (IV)$$

It will be understood that the values of the various resistances and other components are subject to variation dependent upon the material of which the test strip is composed, upon other factors dependent upon the nature of the use in which the device is employed, and upon over-all circuit characteristics, and it is not intended that the invention be limited by the actual values given. In general, however, the resistances R1 to R9 are of progressively smaller values. For optimum results, these resistances are selected so that the test trace for a particular standard strip is as nearly as possible a straight line, and non-linearity is adjusted by adjusting variable resistance R17 in the regulatory circuit.

It will also be understood that the improved photomultiplier and regulator circuits of FIG. 3 may be advantageously utilized in various densitometer systems utilizing conventional scanning means and voltage recording or measuring devices, as well as with the novel scanning and oscilloscope means of the present invention.

According to the measuring and display system of the invention, as shown in FIG. 4, the signal from the photomultiplier tube assembly 37, which may have a suitable regulating circuit as described above and designated by block 120, is fed to three different points; electronic switch 122, integrator 124, and one terminal of three-way switch 132.

The electronic switch 122 is preferably of a type having a pair of gating tubes controlled by a multivibrator unit.

A number of suitable electronic switching devices of this type are available, and since such devices are conventional, no detailed description of the circuitry of unit 122 is deemed necessary herein. Reference is made, however, to a circuit described by Weger, Radio-Electronics, No. 10, 134, 1954, which has been found particularly suitable in this combination. This circuit briefly has the advantages of completely eliminating critical circuit frequency adjustments, avoids breaking of the scope traces during the swtiching process, and permits a switching frequency which need not be higher than the scope's sweep frequency because the switching occurs during the retrace.

The signal from the photomultiplier tube 37 is fed to one of the gating tubes of the electronic switch 122, and the other gating tube may be fed by a signal from the electronic integrator 124 through a switch 126.

Electronic voltage integrators are conventional in the art and any of a number of types may be employed in the present system. A suitable integrator circuit is that described by R. Madey and G. Farley, Review of Scientific Instruments, vol. 25, 275, 1954. This circuity is preferred because it provides for filament drift compensation and has internal positive feed back to provide high amplifier gain, low-grid current, large linear output range, and provisions to adjust input and output voltages to zero when no signal is present.

The multivibrator unit of the electronic switch 122 is controlled by a signal from synchronization pulse amplifier 128, which is derived from the synchronization photo tube 59 excited by synchronization exciter lamp 73 through the synchronizing drum 55 connected to mechanically rotate at the same speed as the scanning drum 15. The output signal from the electronic switch 122 is fed to one of the terminals 130 of three-way switch 132, also provided with terminals 134 and 136. Terminal 134 of the three-way switch 132 is directly connected to the output terminal of the photomultiplier tube 37 and switch terminal 136 is connected to the integrator 124. Selector arm 138 of the selector switch 132 is connected to the vertical terminal V of the vertical deflection amplifier of an oscilloscope 140. This oscilloscope 140 may be either of the magnetic deflection type or of the electrostatic deflection type. However, it is preferred to use a magnetic deflection type because of the larger screen area. A particularly suitable oscilloscope of the latter type is obtainable from Electromec, Incorporated, Burbank, California (Models 1710 or 2110).

It will thus be seen that the vertical deflection amplifier of oscilloscope 140 may be selectively connected to the terminal 130 whereby it may be controlled by a signal from the electronic switch 122, or to the terminal 134 whereby it is controlled directly by a signal from the photomultiplier tube 37, or to the terminal 136 whereby it is controlled by the integrated signal from integrator 124. The horizontal amplifier of the oscilloscope 140 is connected through a selector switch 142 to the integrator 124. It will be seen that the signal from integrator 124 may be used to control either the horizontal or vertical deflection amplifier of the oscilloscope. The switches 126 and 142 are mechanically connected by suitable coupling means shown by the dotted line 144 whereby when one of these switches is closed, the other is open.

The horizontal sweep circuit of the oscilloscope 140 is controlled by a pulsing signal through line 146 from the synchronization pulse amplifier 128.

In one mode of operation of the device, the selector arm 132 of switch 138 is set to connect with terminal 134 thereby feeding the signal from photomultiplier tube 37 directly to the vertical amplifier of oscilloscope 140. In this arrangement, switch 142 is open. The signal from the synchronization photo tube 59, controlling synchronization pulse amplifier 128, is fed through line 146 to the horizontal sweep circuit of oscilloscope 140. This then yields a plot on the oscilloscope screen according to $\Delta V/\Delta L$ against L, as illustrated by the plot of that relationship shown in FIG. 6.

In a second mode of operation, the output signal from photomultiplier tube 37 is fed to integrator 124 to provide a signal proportional to the integrated function of $\Delta V/\Delta L$ with respect to time, which is then fed to terminal 136 of switch 132. Selector arm 138 of switch 132 connects the integrator output signal to the vertical amplifier of oscilloscope 140. Here again the horizontal sweep amplifier of oscilloscope 140 is connected to the synchronization pulse amplifier 128. Switch 142 again in this case is open. This gives a plot of the integrated voltage $\Delta V/\Delta L$ against the length L of the strip, providing a trace as shown in FIG. 7.

In another mode of operation, the data of both of the foregoing measurements are simultaneously presented by the trace on the scope 140 by means of feeding the signal from photomultiplier tube 37 to one of the gating tubes of the electronic switch 122 and also to the integrator 124, closing switch 126, at the same time opening switch 142, thereby feeding the integrator output into the other gating tube of electronic switch 122. The combination of signals from the electronic switch 122 is then fed to switch terminal 130, through selector arm 138 and to the vertical amplifier of the oscilloscope 140. The horizontal sweep amplifier of oscilloscope 140 is again controlled by means of the synchronization signal from synchronization pulse amplifier 128. A synchronization pulse is also fed through line 148 from amplifier 128 to the multivibrator unit of the electronic switch 122. The end result is the presentation of both traces, as shown in FIGS. 6 and 7, upon the screen of oscilloscope 140 simultaneously whereby the separation points for the band density zones may be accurately determined.

In a further important and novel mode of operation, the signal from photomultiplier tube 37 is fed to integrator 124 and also to terminal 134 of switch 132, whose selector arm 138 is set to contact terminal 134. Switch 142 is closed, simultaneously opening switch 126, allowing the output of integrator 124 to be fed to the horizontal amplifier of oscilloscope 140. The output of photomultiplier tube 37 feeds the vertical amplifier of oscilloscope 140 through the described arrangement of switch 132. The trace in this instance is the one shown in FIG. 8 wherein the ordinate represents the rate of voltage change divided by the rate of progression along the length of the strip $\Delta V/\Delta L$ plotted at progressive points along the length L of the strip. In this instance, the synchronization pulse only controls the oscilloscope cathode ray tube beam return.

In operation, the test strip 11, shown, for example, in FIG. 5, is placed in position on the drum 15 and is secured over the slot 17 by means of the clips 19. The step wedge 45 is adjusted for this particular strip by turning crank 53, and various electrical components of the system are energized by connecting to an appropriate source of power not shown. The motor 29 is started, revolving the drum 15 at, for example, approximately 25 revolutions per second. The test strip, as shown in FIG. 5, is of the type which may be prepared by electrophoretically concentrating the protein components of human blood serum placed on the strip and by rendering them visible with a dye stain. Accordingly, there will be areas of varying dye densities providing more or less well-defined color bands. In the strip illustrated, a color band A is indicative of the relative amount of albumen in the test serum, and bands α1, α2, β and γ are indicative of the α1, α2, β and γ globulins in the serum. By positioning the selector switch 132 to contact terminal 134 so that the output of the photomultiplier tube 37 controls the vertical amplifier of the oscilloscope while the horizontal sweep circuit is being controlled by a synchronizing pulse from pulse amplifier 127, a curve, as shown in FIG. 6, is obtained having a peak A and succeeding peaks α1, α2, β and γ. The peak A and the area beneath it up to the start of the succeeding peak is proportional to the albumen content in the serum. Similarly peaks α1, α2, β and γ respectively, and the immediate areas thereunder, are proportional to the globulin components. Accordingly, the optical absorbancy of the strip 11 at any longitudinal position on the strip is proportional to the quantity of protein component at that position. Consequently, the relative total areas under each peak, designated Q, R, S, T and U, represent the relative amounts of albumen and globulins in the serum. A trained technician will immediately recognize the significance of the test by the relative configuration of the curve.

Alternatively, the integrator output may be utilized to control the vertical deflection amplifier of the oscilloscope whereby a curve, as shown in FIG. 7, is obtained wherein the differences between the ordinates of successive steps directly indicate the relative amounts of albumen and the respective globulins in the serum. Here the vertical distances R, α1, α2, β and γ indicate the relative amounts of the protein constituents tested by the strip.

By using the electronic switch output to control the vertical deflection amplifier of the oscilloscope, the curves of both FIGS. 6 and 7 can be cast simultaneously upon the screen of the oscilloscope, giving a double visual picture of the test results.

For the most accurate measurement, however, of the quantities of albumen and globulins on the strip, it is preferred to control the vertical deflection amplifier of the oscilloscope with the photomultiplier tube output and the horizontal amplifier of the oscilloscope with the integrated output of the tube whereby the curve of FIG. 8 results. In order to determine the quantities of the various components in the serum, it is only necessary to measure the lengths Q, R, S, T and U between succeeding points along the abscissa of the curve. These points are sharply defined. It will be seen that the system therefore provides means for obtaining very accurate measurement as well as for visually displaying curves of conventional configuration.

While the foregoing description sets forth the preferred means for carrying out the objects of the invention, it is apparent that various changes will occur to those skilled in the art without departing from the broad principles thereof. For example, the test strip may be scanned by other but less effective means wherein the strip is held stationary and the light beam is moved at a constant rate longitudinally over the strip. Numerous variations of the mechanical features of the scanning means are readily apparent. Likewise, variations of the synchronizing features of the invention are possible. For example, a bar magnet may be mounted on the shaft which drives supporting drum 15. An iron core inductive winding may be placed close to the plane of rotation of the magnet. Each time the magnet poles move opposite the inductive winding, a sharp voltage pulse will be induced in the winding which can be utilized as a synchronizing pulse. It will be understood, therefore, that the invention is not limited to the specific mechanical, optical and electrical circuit arrangements disclosed, except as described with particularity in the following claims.

This application is a division of our copending application Serial No. 491,882, filed March 3, 1955, now Patent No. 2,972,925.

We claim:
1. In a radiation-measuring system the combination, comprising: a photomultiplier tube provided with a plurality of dynodes connected by a resistance network, an anode, and a photo cathode; said system including a first voltage regulator tube having a plurality of control grids one of which is connected to said anode said photomultiplier tube providing an output signal proportional to the incident light striking said photo cathode whereby a series of voltages substantially linearly proportional to a series of absorbance units of a standard step wedge may be produced; and further regulatory means for automatically varying the resistance of said network in relation to the incident light striking said cathode to thereby provide a substantially linear function of said voltages over a wider range of absorbance units, said further regulatory means comprising a second regulator tube responsive to the output voltage of said photomultiplier tube and connected to a control grid of said first voltage regulator tube.

2. In a radiation-measuring system having a photomultiplier tube for producing voltages substantially linearly proportional to the radiant power transmitted through successive portions of a test strip having bands of varying absorbancy, a voltage regulating means automatically providing control of the voltages from said photomultiplier tube in relation to the incident light striking said photomultiplier tube, and means for providing a second voltage control to control nonlinearity of the voltages from said photomultiplier tube and compensate deviation from absorbance law at the higher end of the absorbance range.

3. In a radiation-measuring system: a photomultiplier tube having a photo cathode and a plurality of dynodes connected by a resistance network, said photomultiplier tube being adapted to provide an output signal containing alternating and direct current components proportional to the incident light striking said photo cathode; a voltage regulator tube connected to said photomultiplier tube; means for applying feed-back to a control grid of said regulator tube to control the plate resistance and thereby regulate the voltage across the dynodes of said photomultiplier tube; and means responsive to the alternating current signal component of said photomultiplier tube to further automatically control the plate resistance of said voltage regulator tube, thereby further controlling the dynamic response and range of said photomultiplier tube.

4. The system of claim 3 wherein said means responsive to the alternating current signal component of said photomultiplier tube comprises a further voltage regulator tube having a control grid responsive to said alternating signal component said further voltage regulator tube having an output connected to a control grid of said first-mentioned voltage regulator tube.

5. The system of claim 4 including a variable resistance in the cathode circuit of said further voltage regulator tube.

References Cited in the file of this patent

UNITED STATES PATENTS

| 2,457,747 | Sweet | Dec. 28, 1948 |
| 2,678,581 | Reisner | May 18, 1954 |